United States Patent [19]

Matoba et al.

[11] Patent Number: 5,034,885
[45] Date of Patent: Jul. 23, 1991

[54] CACHE MEMORY DEVICE WITH FAST DATA-WRITE CAPACITY

[75] Inventors: Tsukasa Matoba, Kawasaki; Takeshi Aikawa, Chofu; Mitsuyoshi Okamura, Tokyo; Kenichi Maeda, Kamakura, all of Japan

[73] Assignee: Kabushiki Kaisha Toshiba, Kawasaki, Japan

[21] Appl. No.: 321,398

[22] Filed: Mar. 10, 1989

[30] Foreign Application Priority Data

Mar. 15, 1988 [JP] Japan .............................. 63-059284
Dec. 9, 1988 [JP] Japan .............................. 63-309915

[51] Int. Cl.[5] ..................... G06F 12/02; G06F 7/02
[52] U.S. Cl. ................... 364/200; 364/243.4; 364/243.41; 364/243.43; 364/246; 364/254; 364/254.2
[58] Field of Search ... 364/200 MS File, 900 MS File

[56] References Cited

U.S. PATENT DOCUMENTS

| | | | |
|---|---|---|---|
| 3,588,839 | 6/1971 | Belady et al. | 364/200 |
| 3,967,247 | 6/1976 | Andersen et al. | 364/200 |
| 4,075,686 | 2/1978 | Calle et al. | 364/200 |
| 4,173,781 | 11/1979 | Cencier | 364/200 |
| 4,493,026 | 1/1985 | Olnowich | 364/200 |
| 4,755,936 | 7/1988 | Stewart et al. | 364/200 |
| 4,858,111 | 8/1989 | Steps | 364/200 |
| 4,884,198 | 11/1989 | Garner et al. | 364/200 |

OTHER PUBLICATIONS

Sparc Architecture Manual, Sun Microsystems, 1987, pp. 37-41.

Primary Examiner—Eddie P. Chan
Assistant Examiner—P. V. Kulik
Attorney, Agent, or Firm—Foley & Lardner

[57] ABSTRACT

A copy-back type cache memory device using a delayed wait method capable of completing a data-write process in one process cycle. The device includes single word memory means for storing the single word of the selected data in a data memory means when an access for a data-write is made, the single word being located at the address in the data memory means corresponding to the processor address; and copy-back memory means for restoring the superseded data along with other data together with which the superseded data forms a block, so that the block can be reorganized in its original state before the data-write process takes place. The device may alternatively include an address latch means for delaying transmission of a processor address from the processor to the data memory means by a predetermined number of process cycles when access by the processor is for a data-write process; and a data latch means for delaying transmission of a processor data from the processor to the data memory means by the predetermined number of process cycles when access by the processor is for a data-write process.

4 Claims, 5 Drawing Sheets

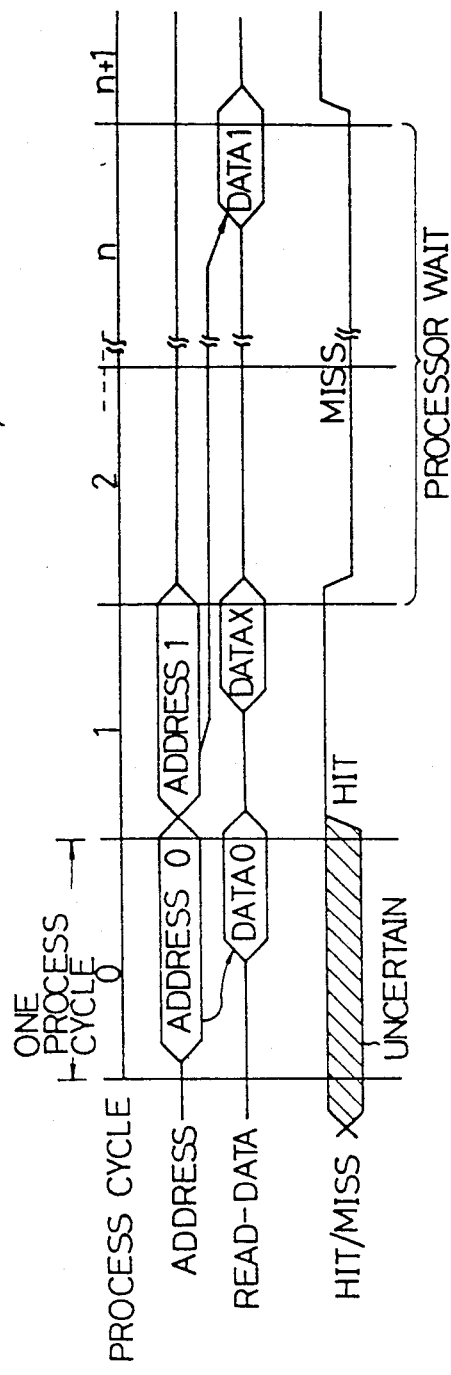
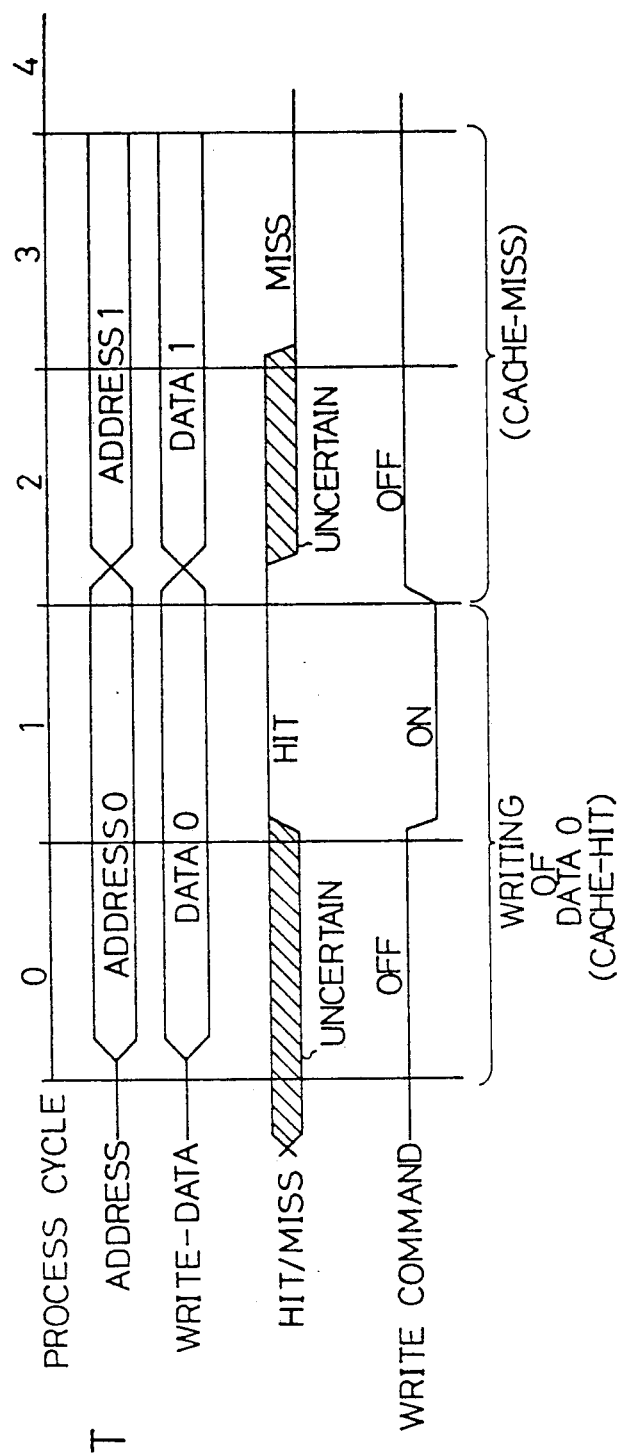
FIG.1 PRIOR ART
FIG.2 PRIOR ART

CACHE MEMORY DEVICE WITH FAST DATA-WRITE CAPACITY

BACKGROUND OF THE INVENTION

1. Field of the Invention

The present invention relates to a cache memory device to be placed between a main memory and a processor in a computer, for the sake of facilitating high speed accesses and, more particularly, to such a cache memory device capable of speeding up data-write processes.

2. Description of the Background Art

As the ability and speed of a processor (or CPU) in a computer improve with advances in research on Architecture and VLSI, it becomes clear that to take full advantage of a high speed processor either the speed of a memory device for access from the processor needs to be improved or the number of such accesses needs to be reduced. To implement such an improvement calls for a high speed memory with a large capacity, but, in general, a high speed memory (static memory) has a small capacity and is expensive, whereas a large capacity memory (dynamic memory) is slow.

As a solution to this situation, the use of a cache memory has been developed. The cache memory is a high speed, small capacity type memory placed between a slow, large capacity main memory and a processor in a system, and those data which are frequently accessed are stored in a data storing part (referred hereafter as a data memory) of the cache memory, in addition to being in the main memory, so that the system as a whole effectively speeds up.

In such a system, there is provided a hit/miss detector for preventing incorrect data processing, which detects the presence in the cache memory of a datum with an address to which the processor attempts to make access (referred hereafter as a processor address), by producing a hit or a miss signal according to present datum or absent datum (referred also as cache-hit or cache-miss in the following), respectively.

This hit/miss detector usually utilizes another memory called a tag memory which stores addresses from the main memory of data stored in the data memory of the cache memory (referred hereafter as a memory addresses), and a comparator which compares the processor address with the memory addresses in the tag memory to decide the presence or the absence in the cache memory of the datum with the address in question. Thus, in this type of system, making access from the processor takes a reading from the tag memory and a comparison at the comparator, which requires extra time for the comparison to be carried out, compared with direct access to the data.

Conventionally, this situation is improved by adopting a so called delayed-wait method in which the data in the data memory are fed to the processor for the data-read process regardless of cache-hit or cache-miss, and information concerning cache-hit or cache-miss, i.e., whether the fed data are right ones or not, is given at the next cycle of the process.

A timing chart for this type of data-read process is shown in FIG. 1, which shows a case in which the data-read at the process cycle 0 is cache-hit, whereas the data-read at the process cycle 1 is cache-miss.

More specifically, at the process cycle 0, an access to an address 0 is made by the processor, and in the same process cycle 0, data 0 having a corresponding location in the data memory are read out and fed to the processor. But, in this process cycle 0, the hit/miss signal is uncertain as it is not specified yet by the hit/miss detector. The hit/miss signal is subsequently ascertained as hit at the next process cycle 1, thereby confirming the legitimacy of the data 0 and the address 0. In effect, the required data 0 are taken to the processor in the process cycle 0 alone.

On the other hand, at the process cycle 1, another access to another address 1 is made and data x having a corresponding location in the data memory are fed. As this is a cache-miss which is indicated by the hit/miss signal being a miss at the next process cycle 2, the data x taken to the processor are regarded as illegitimate and the processor waits until the hit/miss signal becomes a hit. Meanwhile, correct data 1 are read from the main memory, and fed to the processor at the process cycle n, and as the hit/miss signal becomes a hit at the process cycle (n+1), the processor resumes the subsequent operation.

Thus, by this delayed-wait method, it is possible to complete the data-read process in one process cycle so long as the access is a cache-hit, thereby speeding up the data-read process.

However, the same has not been the case for the data-write process conventionally. This is because a data-write process in a conventional cache memory device can be carried out only after the cache-hit or cache-miss of the access is determined, as the data-write process takes place on memories such as a data memory and a main memory.

Especially, a so called copy-back (also called direct mapping) type cache memory has the following problem. In a copy-back type cache memory, a data-write process is carried out in the cache memory only, and not in the main memory. The data in the main memory is changed only when the data in the cache memory is replaced by the other data with different addresses. In other words, only the data in the cache memory are kept up to date. Consequently, it is necessary to ensure that the data-write process is carried out with respect to a correct address. Otherwise, the currently correct data in the cache memory may be destroyed by overwriting incorrect data, and then only the obsolete data in the main memory are left. Thus, it is particularly important for a conventional copy-back type cache memory device to carry out the data-write process only after the cache-hit or cache-miss of the access is determined.

A timing chart for this type of data-write process is shown in FIG. 2, which shows a case in which the data-write at the process cycles 0 and 1 is a cache-hit, whereas the data-write at the process cycles 2 and 3 is a cache-miss. More specifically, at the process cycle 0 an access to an address 0 is made by the processor with data 0 as a write-data. But, since the hit/miss signal at this process cycle 0 is uncertain, a write command is off. Only at the process cycle 1 at which the hit/miss signal becomes a hit does the write command change to on, and the data-write process is carried out. So a single data-write process takes two process cycles. On the contrary, the data-write process for another address 1 with data 1 as a write-data at the process cycles 2 and 3 is cache-miss, so the write command remains the off at both process cycles and data-write process does not take place.

Thus, in a conventional cache memory device, the data-write process requires at least two process cycle, one for determining a cache-hit or a cache-miss, and another for carrying out data-write, which is twice as long as what is required for the data-read process.

SUMMARY OF THE INVENTION

It is therefore an object of the present invention to provide a cache memory device capable of completing a data-write process in one process cycle.

According to one aspect of the present invention there is provided a cache memory device to be placed between a processor and a main memory in a computer, comprising: data memory means for storing selected data in the main memory, a datum of the selected data in the data memory means located at an address in the data memory means corresponding to a processor address with respect to which the processor is making an access being superseded by a processor datum from the processor at a particular process cycle when the access by the processor is for a data-write process; hit/miss detector means for determining, at the particular process cycle, the access as a hit when the access is made with respect to a correct address in the data memory means, and as a miss otherwise; and means for memorizing the datum of the selected data in the data memory means corresponding to the processor address when the access for a data-write is made.

According to another aspect of the present invention there is provided a cache memory device to be placed between a processor and a main memory in a computer, comprising: data memory means for storing selected data in the main memory; hit/miss detector means for determining, at a particular process cycle, an access by the processor as a hit when the access is made with respect to a correct address in the data memory means, in which case one of the selected data in the data memory means located at an address in the data memory means corresponding to a processor address with respect to which the processor is making the access is going to be superseded by a processor datum from the processor at the same process cycle provided the access by the processor is for data-write process, and as a miss otherwise; address latch means for delaying transmission of the processor address from the processor to the data memory means by a predetermined number of process cycles when the access by the processor is for a data-write process; and data latch means for delaying transmission of a processor datum from the processor to the data memory means by the predetermined number of process cycles when the access by the processor is for a data-write process.

Other features and advantages of the present invention will become apparent from the following description taken in conjunction with the accompanying drawings.

BRIEF DESCRIPTION OF THE DRAWINGS

FIG. 1 is a timing chart for a data-read process by a computer using a conventional cache memory device.

FIG. 2 is a timing chart for a data-write process by a computer using a conventional cache memory device.

DETAILED DESCRIPTION OF THE PREFERRED EMBODIIMENTS

Figure 3:
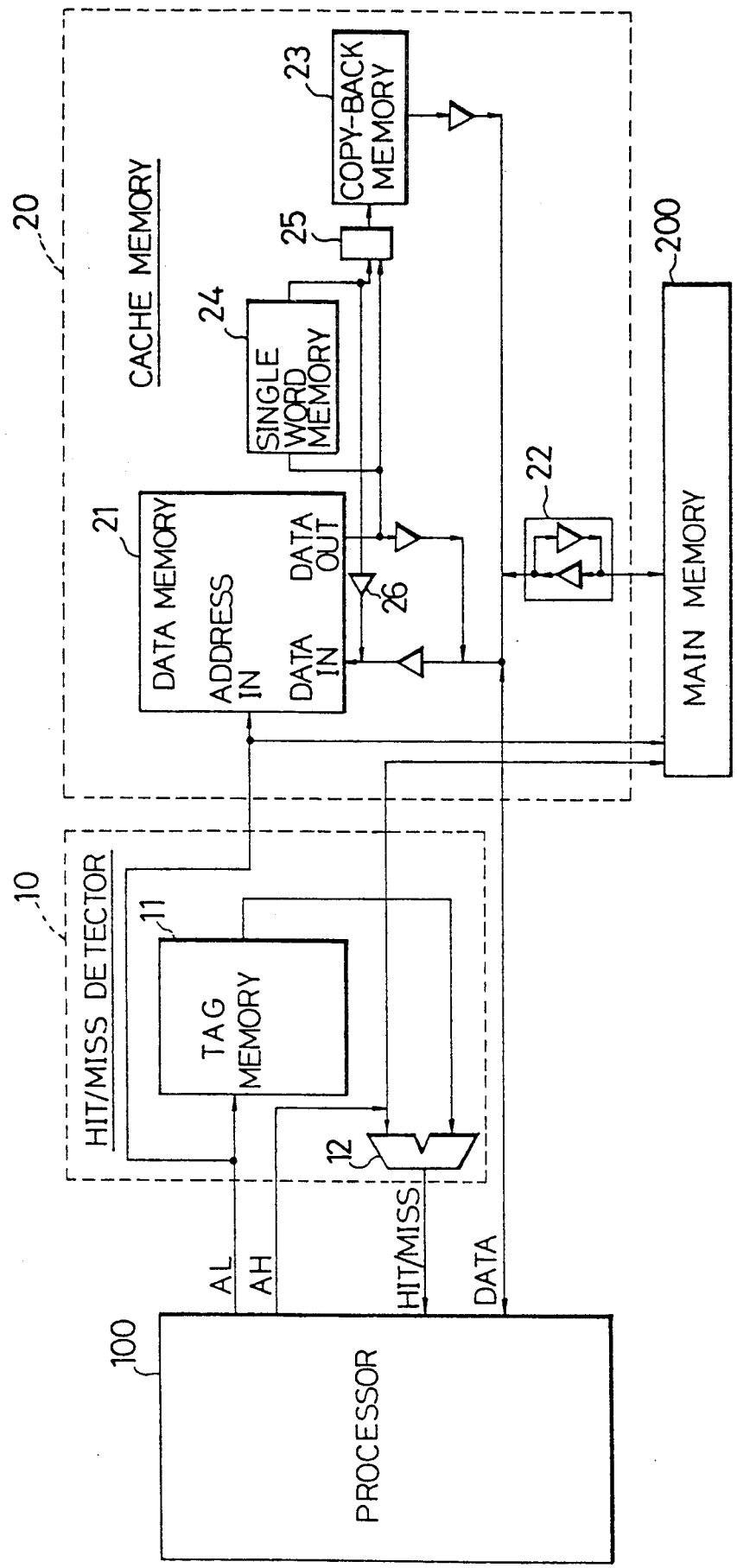
FIG. 3 is a schematic block diagram of one embodiment of a cache memory device according to the present invention.

Referring now to FIG. 3, there is shown one embodiment of a cache memory device according to the present invention.

This cache memory device comprises a hit/miss detector 10 including a tag memory 11 and a comparing circuit 12, for determining a hit or a miss of accesses from a processor 100, and a cache memory 20 including a data memory 21, a memory data buffer 22, a copy-back memory 23, a single word memory 24, a selector 25, and a restoration buffer 26, all of which are placed between the processor 100 and a main memory 200.

The data memory 21 stores those data which are to be frequently accessed by the processor 100. This selection is done naturally, as the frequently accessed data are more likely to be in the data memory 21, since whenever the access is made by the processor 100 the accessed data end up in the data memory, except for the case of a non-cache process which will be explained later. Addresses of the data memory 21 are identical to lower addresses (AL), i.e. a lower half of addresses, of the main memory 200, so there is only one datum in the data memory 21 which has a particular lower address in the main memory 200.

The tag memory 11 stores higher addresses (AH), i.e. an upper half of addresses, in the main memory 200 of those data in the data memory 21.

For the sake of simplicity, in the following description of the present invention, each datum is given as a word comprising 32 bits, and each of a higher and a lower address is given in 16 bits, i.e. 4 binary digits. This means there are sixteen distinct lower addresses possible, so that the data memory 21 has sixteen entries each of which stores the datum with one of the sixteen distinct lower addresses in the main memory 200. Also, the copy-back memory 23 has the capacity of storing four words at a time, and a single word memory 24 has a capacity of storing one word at a time.

Figure 4:
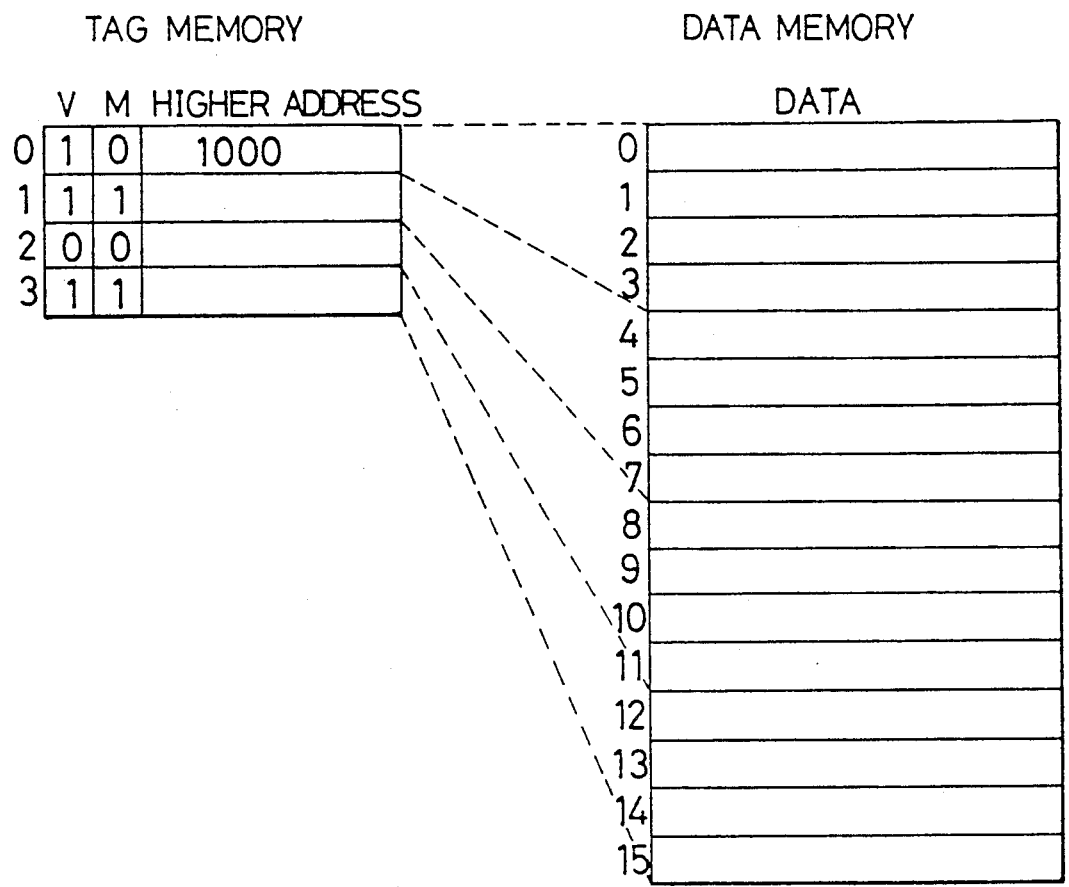
FIG. 4 is a diagrammatic illustration of memory spaces in a data memory and a tag memory of the cache memory device shown in FIG. 3.

The relation between the contents of the tag memory 11 and the data memory 21 is shown in FIG. 4. The tag memory 11 has, in addition to the higher addresses of the data in the data memory, a validity flag V indicating the validity of the data by 1(valid) or 0(invalid), and a modification flag M indicating the occurrence of the modification of the data while in the data memory 21 by 1(modified) or 0(unmodified). Each entry of the tag memory 11 corresponds to four data in the data memory 21 which share a common higher address in the main memory 200, and which form a block. In other words, there are always exactly four data in the data memory 21 which belong to a block. Accordingly, there are always sixteen data divided into four blocks in the data memory 21, and four data in the tag memory 11 corresponding to four blocks of the data memory 21.

The tag memory 11 is fed with a lower address (AL) of a processor address and gives the higher address (AH) corresponding to the block containing a datum which has this particular lower address to the comparing circuit 12. This is possible because there is a unique correspondence between an entry in the tag memory 11 and four lower addresses which in turn are addresses in the data memory 21, once the particular lower address is specified the tag memory 11 can pick a unique higher address.

The comparing circuit compares the higher address from the tag memory 11 with a higher address of the processor address, and produces a hit signal when these two higher addresses coincide or otherwise produces a miss signal, indicating cache-hit or cache-miss, respectively.

Meanwhile, the lower address of the processor address is also given to the data memory 21. In a case of the data-read process, data in the data memory 21 stored at the address having the same lower address as that of the processor address is fed to the processor 100 regardless of cache-hit or cache-miss, as in a conventional cache memory device. In other words, this cache memory device adopts a delayed-wait method. When there is a cache-miss, the correct data to be accessed will be taken from the main memory 200 through the memory data buffer 22 to the processor 100.

In addition, this cache memory device is a copy-back type in which a data-write process is carried out on the cache memory 20 only, and not on the main memory 200, and the data in the main memory 200 is changed only when the data in the cache memory 20 is replaced by other data which is different. In order to save the data in such a replacement, there is provided a copy-back memory 23 where the data is temporarily stored before the replacement, and from which the data is given to the main memory 200 later on. As mentioned above, this copy-back memory 23 has a capacity for storing four words at a time, so that the whole data of one block in the data memory 21 can be stored together.

As for the data-write process, data to be written are entered from the processor 100 into the data memory 21, also regardless of cache-hit or cache-miss, which is a characteristic of this embodiment. At the same time, what was originally in the address to which the datum is entered is stored in the single word memory 24.

Now, since this cache memory device is a copy-back type, there are two possibilities when the cache-miss occurs for valid data.

The first case is where the content of the valid data in the data memory 21 is identical to that in the main memory 200, i.e. when the valid data has not been modified by the processor 100 while in the data memory 21. In this case, the incorrect data-write due to the cache-miss will be corrected by restoring the valid data by taking the correct content of the valid data from the main memory 200, through the memory data buffer 22, to the incorrectly overwritten address in the data memory 21.

The second case, on the other hand, is where the content of the valid data in the data memory 21 is different from that in the main memory 200, i.e. when the valid data has been modified by the processor 100 while in the data memory 21. In order to avoid an accidental loss of the valid data in this case, there is provided a connection between the copy-back memory 23 and the single word memory 24 through the selector 25. Thus, when the cache-miss is established and the replacement of the original data in the remaining addresses of the block containing the newly entered datum takes place, for the purpose of reinstalling the consistency regarding the higher address within the block, what are in the block consisting of the newly entered datum and original data in the remaining addresses of the block are temporarily stored in the copy-back memory 23 with the newly entered datum replaced by the original datum stored in the single word memory 24, by means of the selector 25. In other words, the original data before cache-miss are reconstructed in the copy-back memory 23, which will be stored in the main memory 200 later on, so that the accidental loss of the valid data can be avoided in this embodiment.

Figure 5:
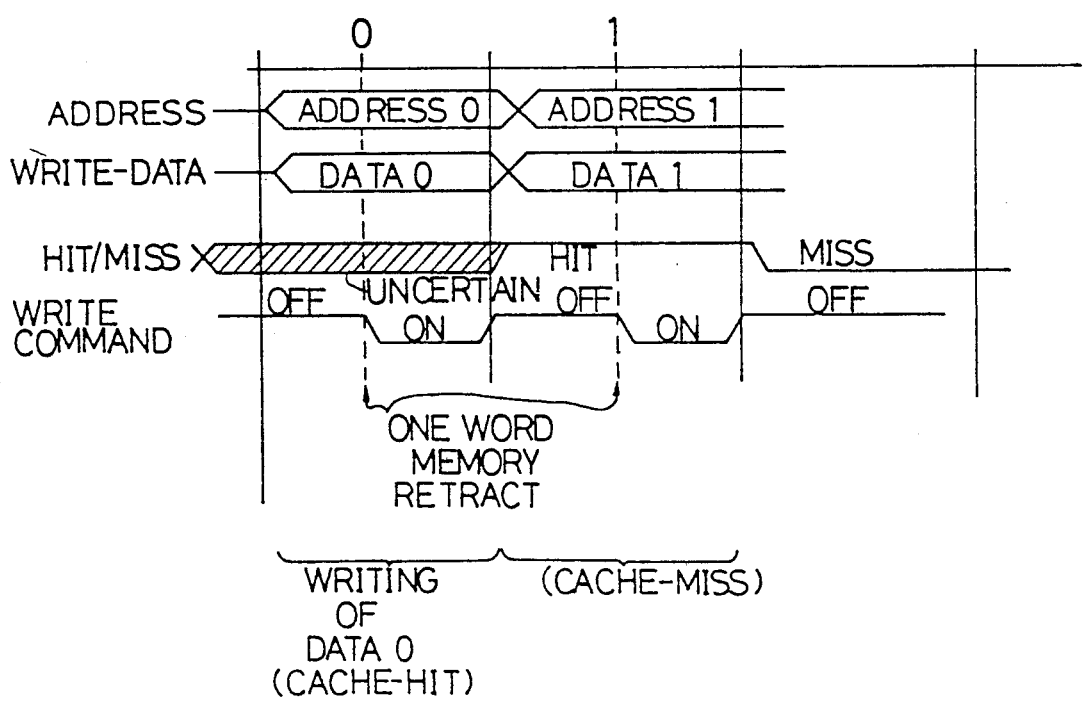
FIG. 5 is a timing chart for a data-write process by a computer using the cache memory device shown in FIG. 3.

The timing chart for the data-write processes of this embodiment of the cache memory device is shown in FIG. 5. Since it is possible in this embodiment to enter the write-data from the processor 100 into the data memory 21 regardless of cache-hit or cache-miss, the write command can be turned on within the same process cycle in which the access for the data-write is initiated by the processor 100, as shown in FIG. 5. The hit/miss signal becomes certain only in the next process cycle, as in the conventional cache memory device, but, since there is no accidental loss of the valid data, the occurrence of the cache-miss causes no problem in this embodiment.

Furthermore, this embodiment is effective in another conventionally problematic situation called non-cache processes. The non-cache processes are those processes in which the cache memory 20 is by-passed and the accesses are made directly to the main memory 200 or an I/O register (not shown). Such a non-cache process can cause an incorrect writing in the data memory 21 when the determination as to whether it is a non-cache process or not is made later than the hit/miss signal becomes certain, and a cacheing takes place despite of the designation of the process as a non-cache one. In order to restore the original datum in such a case, there is provided a restoration buffer 26 which allows the return of the original data stored in the single word memory 24 to the data memory 21. The other buffers in the cache memory 20 are provided in order to offer restrictive passages for signals transmitting in opposite directions.

As described so far, according to this embodiment of the cache memory device, it is possible to complete a data-write process in one process cycle, without a risk of an accidental loss of the valid data.

Figure 6:
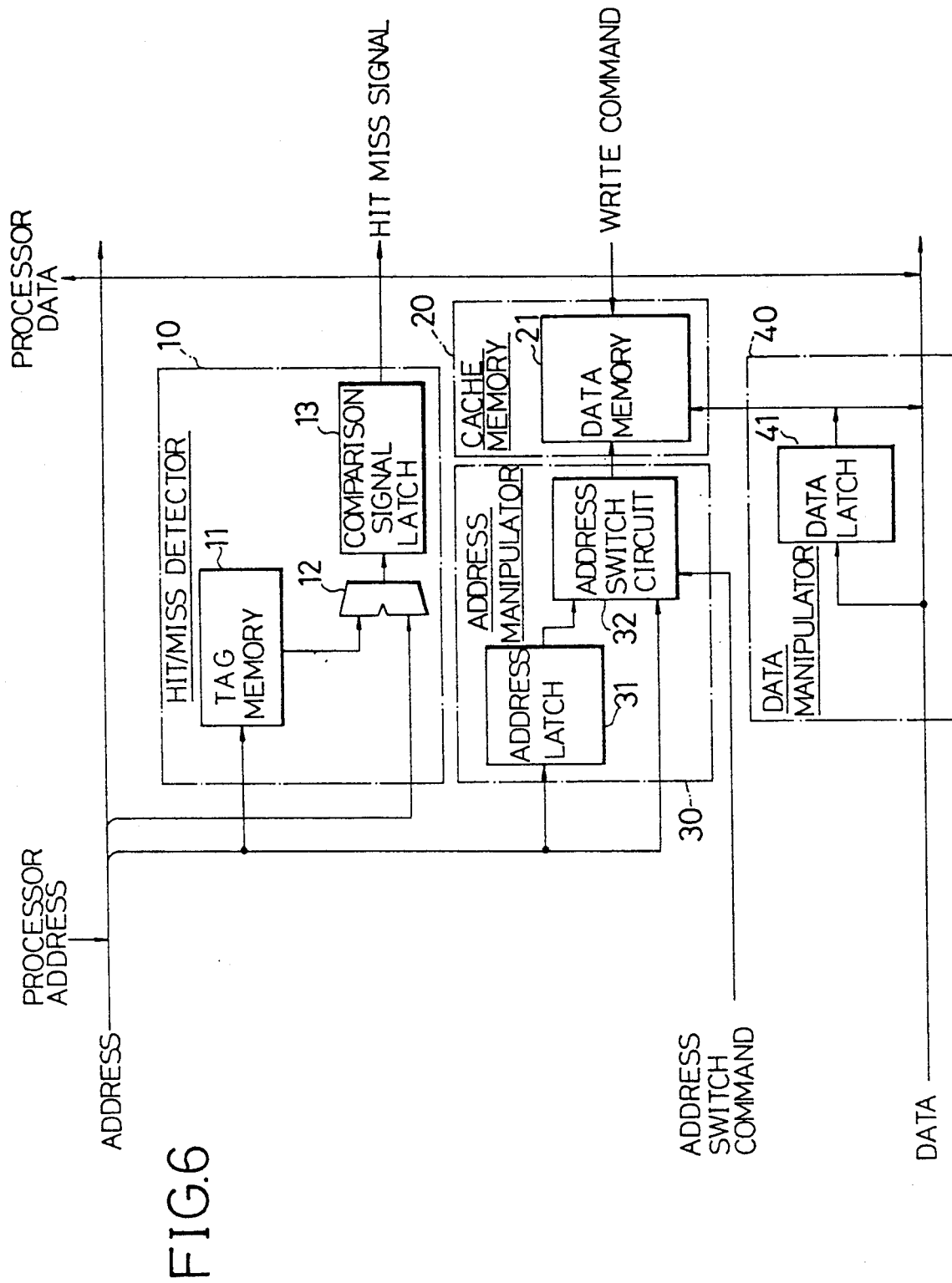
FIG. 6 is a schematic block diagram of another embodiment of a cache memory device according to the present invention.

Referring now to FIG. 6, there is shown another embodiment of the cache memory device according to the present invention. In the following description of this embodiment of the present invention, parts which are equivalent to corresponding parts in the previous embodiment are labeled by the same number in the figures and their explanation will not be repeated. Also, the relation between the contents of the tag memory 11 and the data memory 21 shown in FIG. 4 is relevant to this embodiment as well.

This cache memory device comprises a hit/miss detector 10 including a tag memory 11, a comparing circuit 12, and a comparison signal latch 13 for delaying transmissions of the hit/miss signals from the comparing circuit 12 by one process cycle, for determining a hit or a miss of accesses from a processor (not shown); a cache memory 20 including a data memory 21, which is placed between the processor (not shown) and a main memory (not shown); an address manipulator 30 including an address latch 31 for delaying transmissions of addresses from the processor (not shown) by one process cycle, and an address switch circuit 32 for selectively providing one of either an address currently coming from the processor (not shown) or an address coming from the address latch 31 after one process cycle delay, to the data memory 21 in accordance with an address switch command to be given; and a data manipulator 40 including a data latch 41 for delaying transmissions of data from the processor (not shown) to the data memory 21 by one process cycle.

In addition, this cache memory device may be a copy-back type in which a data-write process is carried out on the cache memory 20 only, but a copy-back memory and other features related to this aspect of this embodiment are not shown in FIG. 6 as they are not needed in the following description of the distinct feature of this embodiment.

In case of a data-read process, the address switch command dictates that the address switch circuit selects an address currently coming from the processor (not shown), and the data in the data memory 21 stored at the corresponding address are fed to the processor (not shown), through the data manipulator 40 but without being delayed by the data latch 41, regardless of cache-hit or cache-miss, as in the previous embodiment. In other words, this embodiment of the cache memory device also adopts the delayed-wait method. When there is a cache-miss, the correct data to be accessed will be taken from the main memory (not shown), as in the previous embodiment.

As far as the data-write process is concerned, the address switch command dictates that the address switch circuit 32 selects an address coming from the address latch 31 after one process cycle delay, and the write-data from the processor (not shown) are given to the data memory 21 only after one process cycle delay by the data latch 41. Since the hit/miss signal is uncertain in an initial process cycle of the data-write process, and becomes certain only in the next process cycle as already explained above, the delays of the address and the data to be given to the data memory 21, the data-write process at the data memory 21 effectively takes place at the same process cycle in which the hit/miss signal is ascertained.

Figure 7:
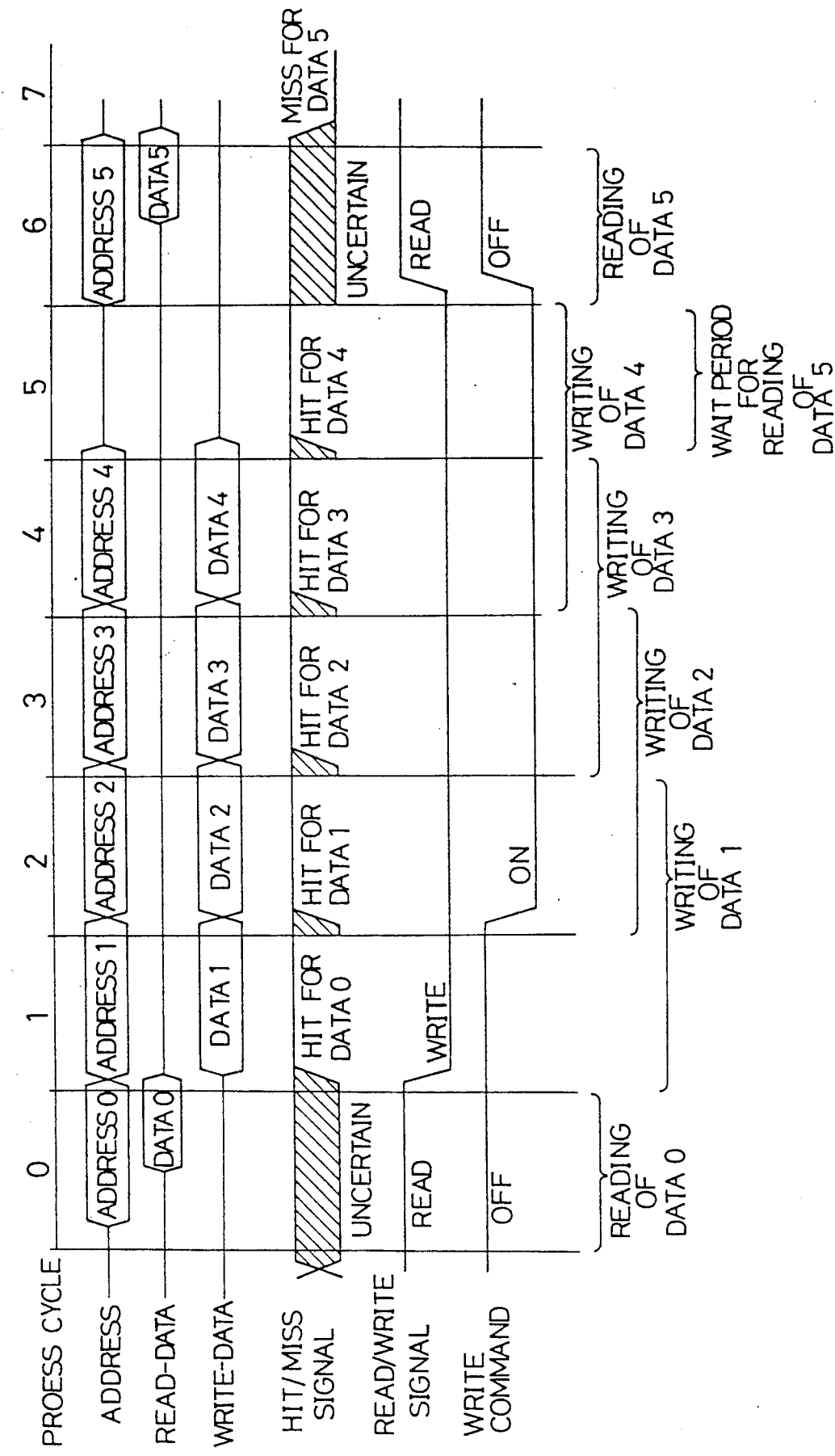
FIG. 7 is a timing chart for data-read and data-write processes by a computer using the cache memory device shown in FIG. 6.

The timing chart for the data-read and the data write processes by this embodiment of the cache memory device is shown in FIG. 7, which shows a case in which a data-read process at the process cycle 0 is followed by a series of four data-write processes, all being cache-hit. To be more specific, at the process cycle 0 the data 0 in the address 0 are read in the delayed-wait method, which is confirmed as cache-hit at the process cycle 1 as the hit/miss signal becomes a hit.

Meanwhile, at the process cycle 1 the data 1 to be written in the address 1 comes in from the processor (not shown). These data 1 and the address 1 are delayed by the data latch 41 and the address latch 31, respectively, but the address 1 is also given without any delay to the hit/miss detector 10. As a result, the data memory 21 is provided with these data 1 and the address 1 at the same process cycle 2 in which the hit/miss signal becomes certain, so the data-write of the data 1 is carried out at the process cycle 2. Thus, this data-write process of the data 1 takes two process cycles as in the conventional cache memory device. However, at the process cycle 2, while the data-write of the data 1 is completed at the data memory 21, the data-write of the data 2 in the address 2 is started as far as the hit/miss detector 10, the address latch 31, and the data latch 41 are concerned, so that this data-write of the data 2 can be completed in the next process cycle 3 at the data memory 21. In other words, a series of the data-write processes can be handled in succession without waiting for the outcome of the hit/miss signal at each data-write process of the series.

When a data-write process follows the series of the data-write processes, as at the process cycle 6, one process cycle is taken as a wait period so that the preceding data-write process can be completed before the next data-read process takes place.

As explained, according to this embodiment, it is possible effectively to complete the data-write process in one process cycle in most cases, so that the processing time taken by the data-write processes as a whole can be reduced in approximately one half.

It is to be noted that although the embodiments in the above have been described with specific numbers and configurations for the sake of clarity, many modifications and variations of these embodiments may be made without departing from the novel and advantageous features of the present invention. Accordingly, all such modifications and variations are intended to be included within the scope of the appended claims.

What is claimed is:

1. A cache memory device to be placed between a processor and a main memory in a computer, comprising:
    data memory means for storing selected data stored in said main memory, one of said selected data in said data memory means, which is located at an address in said data memory means corresponding to a processor address to which said processor is making an access, being superseded as a superseded one of said selected data by one of processor data from said processor at a particular process cycle when said access by said processor is for a data-write process, and a group of a plurality of data among said selected data being stored as a block of data in said data memory means; hit/miss detector means for determining, at said particular process cycle, said access as a hit when said access is made with respect to a correct address in said data memory means, and as a miss otherwise;
    means for memorizing said superseded one of said selected data at said address in said data memory means corresponding to said processor address when said access for said data-write process is made;
    copy-back memory means for storing one block of data which contained said superseded one of said selected data in said data memory means in an original state before said data-write process took place; and
    selector means for selecting said superseded one of said selected data memorized in said means for memorizing as an input, corresponding to said processor address, to said copy-back memory means at another process cycle later than said particular process cycle only when said access was determined as a miss, such that said one block in said original state before said data-write process is reconstructed in said copy-back memory means.

2. The device of claim 1, wherein said hit/miss detector means includes:
    tag memory means for storing addresses of said selected data stored in said main memory; and
    means for comparing said processor address with said addresses in said tag memory means, and for determining said access as a hit when one of said addresses in said tag memory means coincides with said processor address, and as a miss otherwise.

3. The device of claim 1, further comprising restoration buffer means connecting said data memory means and said means for memorizing, for restoring data in said means for memorizing into an address in said data memory means corresponding to said processor address when said access by said processor is for a non-cache data-write process.

4. The device of claim 1, wherein a data-read process is carried out in a delayed-wait method such that said data-read process can be completed in one process cycle.

* * * * *